(12) United States Patent
Tessman, Jr. et al.

(10) Patent No.: US 10,262,150 B2
(45) Date of Patent: *Apr. 16, 2019

(54) MONITORING DIGITAL IMAGES

(71) Applicant: Google LLC, Mountain View, CA (US)

(72) Inventors: Gary Tessman, Jr., Charles Town, WV (US); Patrick D. Lippert, Santa Ana, CA (US); Timothy B. Hayman, Irvine, CA (US)

(73) Assignee: Google LLC, Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/959,813

(22) Filed: Apr. 23, 2018

(65) Prior Publication Data

US 2018/0247066 A1 Aug. 30, 2018

Related U.S. Application Data

(63) Continuation of application No. 15/345,446, filed on Nov. 7, 2016, now Pat. No. 9,953,177, which is a continuation of application No. 14/563,744, filed on Dec. 8, 2014, now Pat. No. 9,507,954, which is a continuation of application No. 13/769,203, filed on
(Continued)

(51) Int. Cl.
| | |
|---|---|
| *G06F 17/30* | (2006.01) |
| *G06F 21/31* | (2013.01) |
| *G06F 21/62* | (2013.01) |
| *H04L 29/06* | (2006.01) |
| *H04L 29/08* | (2006.01) |

(Continued)

(52) U.S. Cl.
CPC ...... *G06F 21/6209* (2013.01); *G06F 17/3028* (2013.01); *G06F 21/31* (2013.01); *G06Q 50/184* (2013.01); *H04L 51/04* (2013.01);
*H04L 51/10* (2013.01); *H04L 51/12* (2013.01); *H04L 63/0428* (2013.01); *H04L 63/10* (2013.01); *H04L 63/123* (2013.01); *H04L 67/1097* (2013.01); *H04L 67/22* (2013.01); *G06F 2221/2101* (2013.01); *G06F 2221/2149* (2013.01)

(58) Field of Classification Search
CPC ........ H04N 21/4542; H04N 2005/4414; G06F 2221/2141; G06F 21/10; G06F 21/31; G06F 2221/2149; G06F 21/50; G06F 2221/2101; G06F 21/6209; H04L 63/10; H04L 63/123; H04L 51/10; H04L 51/12; H04L 67/22; G06Q 20/35785; G06K 9/623

See application file for complete search history.

(56) References Cited

U.S. PATENT DOCUMENTS 5,832,212 A 11/1998 Cragun et al.
5,835,722 A 11/1998 Bradshaw et al.
(Continued)

OTHER PUBLICATIONS

IPlanet e-Commerce Solutions, "IPlanet Application Server 6.0 White Paper", Technical Report, May 2001, pp. 1-124.
(Continued)

*Primary Examiner* — Sargon N Nano
(74) *Attorney, Agent, or Firm* — Byrne Poh LLP

(57) ABSTRACT

Digital images are monitored by enabling access to a digital image, receiving a notification associated with the digital image from a first user, and regulating access of the first user to the digital image based on the notification received from the first user.

21 Claims, 6 Drawing Sheets

Related U.S. Application Data

Feb. 15, 2013, now Pat. No. 8,909,773, which is a continuation of application No. 12/838,588, filed on Jul. 19, 2010, now Pat. No. 8,380,844, which is a continuation of application No. 11/539,587, filed on Oct. 6, 2006, now Pat. No. 7,779,117, which is a continuation of application No. 10/158,180, filed on May 31, 2002, now Pat. No. 7,120,687, which is a continuation-in-part of application No. 10/007,696, filed on Dec. 10, 2001, now Pat. No. 7,197,513.

(60) Provisional application No. 60/251,834, filed on Dec. 8, 2000.

(51) Int. Cl.
 *G06Q 50/18* (2012.01)
 *H04L 12/58* (2006.01)

(56) References Cited

U.S. PATENT DOCUMENTS

| | | | |
|---|---|---|---|
| 5,938,767 | A | 8/1999 | Horn |
| 5,996,011 | A | 11/1999 | Humes |
| 6,017,157 | A | 1/2000 | Garfinkle et al. |
| 6,052,785 | A | 4/2000 | Lin et al. |
| 6,061,693 | A | 5/2000 | Carney et al. |
| 6,065,055 | A | 5/2000 | Hughes et al. |
| 6,092,023 | A | 7/2000 | Kunishige |
| 6,118,485 | A | 9/2000 | Hinoue et al. |
| 6,119,135 | A | 9/2000 | Helfman |
| 6,133,985 | A | 10/2000 | Garfinkle et al. |
| 6,135,646 | A | 10/2000 | Kahn et al. |
| 6,185,625 | B1 | 2/2001 | Tso et al. |
| 6,192,477 | B1 | 2/2001 | Corthell |
| 6,209,003 | B1 | 3/2001 | Mattis et al. |
| 6,216,112 | B1 | 4/2001 | Fuller et al. |
| 6,266,664 | B1 | 6/2001 | Russell-Falla et al. |
| 6,275,938 | B1 | 8/2001 | Bond et al. |
| 6,286,001 | B1 | 9/2001 | Walker et al. |
| 6,292,795 | B1 | 9/2001 | Peters et al. |
| 6,292,880 | B1 | 9/2001 | Mattis et al. |
| 6,314,452 | B1 | 11/2001 | Dekel et al. |
| 6,323,899 | B1 | 11/2001 | Robert et al. |
| 6,381,629 | B1 | 4/2002 | Lee |
| 6,389,460 | B1 | 5/2002 | Stewart et al. |
| 6,421,733 | B1 | 7/2002 | Tso et al. |
| 6,446,119 | B1 | 9/2002 | Olah et al. |
| 6,460,055 | B1 | 10/2002 | Midgley et al. |
| 6,507,904 | B1 | 1/2003 | Ellison et al. |
| 6,587,945 | B1 | 7/2003 | Pasieka |
| 6,606,659 | B1 | 8/2003 | Hegli et al. |
| 6,661,904 | B1 | 12/2003 | Sasich et al. |
| 6,675,162 | B1 | 1/2004 | Russell-Falla et al. |
| 6,675,214 | B2 | 1/2004 | Stewart et al. |
| 6,697,944 | B1 | 2/2004 | Jones et al. |
| 6,745,367 | B1 | 6/2004 | Bates et al. |
| 6,751,670 | B1 | 6/2004 | Patterson |
| 6,845,395 | B1 | 1/2005 | Blumenau et al. |
| 6,904,168 | B1 | 6/2005 | Steinberg et al. |
| 7,093,023 | B2 | 8/2006 | Lockwood et al. |
| 7,120,678 | B2 | 10/2006 | Greuel |
| 7,120,687 | B1 | 10/2006 | Tessman, Jr. |
| 7,127,515 | B2 | 10/2006 | Patterson |
| 7,313,251 | B2 | 12/2007 | Rhoads |
| 7,414,979 | B1 | 8/2008 | Jarvi |
| 7,503,057 | B2 | 3/2009 | Rosin et al. |
| 7,660,815 | B1 | 2/2010 | Scofield et al. |
| 7,685,192 | B1 | 3/2010 | Scofield et al. |
| 7,707,251 | B2 | 4/2010 | Birch |
| 7,774,335 | B1 | 8/2010 | Scofield et al. |
| 7,797,421 | B1 | 9/2010 | Scofield et al. |
| 7,831,582 | B1 | 11/2010 | Scofield et al. |
| 7,860,895 | B1 | 12/2010 | Scofield et al. |
| 7,966,395 | B1 | 6/2011 | Pope et al. |
| 8,042,064 | B2 | 10/2011 | Cardu |
| 8,060,403 | B1 | 11/2011 | Grossblatt et al. |
| 8,078,615 | B2 | 12/2011 | Smith et al. |
| 8,533,349 | B2 | 9/2013 | Hegli et al. |
| 2001/0037323 | A1 | 11/2001 | Moulton et al. |
| 2001/0041053 | A1* | 11/2001 | Abecassis ............... A63F 13/10 386/291 |
| 2002/0032691 | A1 | 3/2002 | Rabii et al. |
| 2002/0049806 | A1* | 4/2002 | Gatz ...................... G06F 21/62 709/203 |
| 2002/0055942 | A1 | 5/2002 | Reynolds et al. |
| 2002/0060750 | A1* | 5/2002 | Istvan .................. G06F 3/0481 348/569 |
| 2002/0135801 | A1 | 9/2002 | Tessman et al. |
| 2002/0152160 | A1 | 10/2002 | Allen-Rouman et al. |
| 2003/0084299 | A1 | 5/2003 | Tamura et al. |
| 2003/0212699 | A1 | 11/2003 | Denesuk et al. |
| 2004/0123135 | A1* | 6/2004 | Goddard ................ H04N 7/163 726/27 |
| 2004/0143451 | A1 | 7/2004 | McIntyre et al. |
| 2004/0185830 | A1 | 9/2004 | Joao et al. |
| 2004/0220926 | A1 | 11/2004 | Lamkin et al. |
| 2006/0117344 | A1* | 6/2006 | Lamkin ............. G06F 17/30017 725/38 |
| 2007/0239684 | A1 | 10/2007 | Anderson et al. |
| 2007/0288959 | A1* | 12/2007 | Istvan .................... H04N 7/173 725/39 |
| 2010/0293276 | A1 | 11/2010 | Rhoads |
| 2011/0087485 | A1* | 4/2011 | Maude ................ H04L 12/1827 704/9 |
| 2011/0125844 | A1* | 5/2011 | Collier .................... H04L 67/12 709/204 |
| 2012/0156667 | A1* | 6/2012 | Singer ...................... G09B 5/00 434/350 |
| 2012/0158852 | A1* | 6/2012 | Goldsmith ............. G06Q 10/10 709/205 |
| 2014/0011961 | A1 | 1/2014 | Hegli et al. |
| 2014/0040368 | A1* | 2/2014 | Janssens ............... H04L 67/306 709/204 |
| 2014/0149887 | A1* | 5/2014 | Bejar ..................... G06Q 10/10 715/753 |
| 2014/0181221 | A1* | 6/2014 | Kushtagi ................. H04L 51/20 709/206 |
| 2015/0302098 | A1* | 10/2015 | Hern ................. G06F 17/30867 707/708 |
| 2016/0294755 | A1* | 10/2016 | Prabhu .................... H04L 51/12 |

OTHER PUBLICATIONS

Notice of Allowance dated Dec. 19, 2017 in U.S. Appl. No. 15/345,446.
Notice of Allowance dated Apr. 5, 2010 in U.S. Appl. No. 11/539,587.
Notice of Allowance dated May 2, 2006 in U.S. Appl. No. 10/007,696.
Notice of Allowance dated Jul. 19, 2016 in U.S. Appl. No. 14/563,744.
Notice of Allowance dated Aug. 4, 2014 in U.S. Appl. No. 13/769,203.
Office Action dated Jan. 4, 2011 in U.S. Appl. No. 12/838,588.
Office Action dated Jan. 22, 2016 in U.S. Appl. No. 14/563,744.
Office Action dated Apr. 14, 2017 in U.S. Appl. No. 15/345,446.
Office Action dated Apr. 21, 2014 in U.S. Appl. No. 13/769,203.
Office Action dated May 6, 2005 in U.S. Appl. No. 10/007,696.
Office Action dated May 11, 2015 in U.S. Appl. No. 14/563,744.
Office Action dated Jun. 21, 2011 in U.S. Appl. No. 12/838,588.
Office Action dated Jun. 22, 2005 in U.S. Appl. No. 10/158,180.
Office Action dated Jun. 26, 2008 in U.S. Appl. No. 11/539,587.
Office Action dated Aug. 23, 2004 in U.S. Appl. No. 10/007,696.
Office Action dated Sep. 1, 2015 in U.S. Appl. No. 14/563,744.
Office Action dated Sep. 19, 2013 in U.S. Appl. No. 13/769,203.
Office Action dated Sep. 29, 2017 in U.S. Appl. No. 15/345,446.
Office Action dated Oct. 22, 2012 in U.S. Appl. No. 12/838,588.
Office Action dated Nov. 21, 2005 in U.S. Appl. No. 10/07,696.
Office Action dated Dec. 16, 2005 in U.S. Appl. No. 10/158,180.
Notice of Allowance dated Jun. 7, 2006 in U.S. Appl. No. 10/158,180.

(56) References Cited

OTHER PUBLICATIONS

Notice of Allowance dated Oct. 22, 2012 in U.S. Appl. No. 12/838,588.
Office Action dated Dec. 21, 2011 in U.S. Appl. No. 12/838,588.

* cited by examiner

MONITORING DIGITAL IMAGES

CROSS-REFERENCE TO RELATED APPLICATIONS

This application is a continuation of U.S. patent application Ser. No. 15/345,446, filed on Nov. 7, 2016, which is a continuation of U.S. patent application Ser. No. 14/563,744, filed on Dec. 8, 2014, which is a continuation of U.S. patent application Ser. No. 13/769,203, filed on Feb. 15, 2013, which is a continuation of U.S. patent application Ser. No. 12/838,588, filed on Jul. 19, 2010, which is a continuation of U.S. patent application Ser. No. 11/539,587, filed on Oct. 6, 2006, which is a continuation of U.S. patent application Ser. No. 10/158,180, filed on May 31, 2002, which is a continuation of U.S. application Ser. No. 10/007,696, filed Dec. 10, 2001, which claims the benefit of U.S. Provisional Patent Application No. 60/251,834, filed on Dec. 8, 2000, each of which is hereby incorporated by reference in its entirety.

TECHNICAL FIELD

The present invention relates generally to an online communications system and more particularly to an online communications system for monitoring digital images.

BACKGROUND

In the client-server network architecture of the Internet and/or Web, electronic documents are stored in computer systems running server programs and are accessed by computer systems running client programs. For example, information on the Web is made available by Web servers for access by client programs such as Web browsers (e.g., Netscape's Navigator, Microsoft's Internet Explorer, Java's micro-browser).

Information on the Internet and/or Web may be represented by specially formatted text files (e.g., Web pages) written in Hypertext Markup Language ("HTML") or some other markup language, such as XML, DHTML, and/or VRML. Each text file may be identified by a network address such as a Universal Resource Locator ("URL"). A typical Web page may include one or more hyperlinks that refer to the network addresses of other Web pages. Hyperlinks may be displayed as underlined text or graphical images that, when clicked, send a request for the associated page. For example, when a hyperlink in a home page is selected, a request is sent out by the client to the address specified in the hyperlink, and the associated Web page is downloaded and displayed, replacing the home page on the user's screen with the associated Web page.

Browsers and other client programs typically use a communications protocol such as Hypertext Transfer Protocol ("HTTP") to request pages from Web servers. HTTP is a request/response protocol. Through a connection established between a client and a server, the client sends a request to the server, and the server provides a response to the client.

An online service provider (e.g., an Internet service provider ("ISP")) may be used to provide users with access to the Internet and/or World Wide Web ("Web"). In general, a user relies on an ISP to enable communication over the Internet and/or Web. An ISP may offer services in addition to basic Internet access such as, for example, providing email and instant messaging services enabling electronic communication, Web-hosting services allowing users to publish homepages, newsgroup services allowing users to read and post to newsgroups, and image services allowing users to view and order digital images of pictures from a developed film roll.

SUMMARY

In one general aspect, digital images are monitored by enabling access to a digital image, receiving a notification associated with the digital image from a first user, and regulating access of the first user to the digital image based on the notification received from the first user.

Implementations may include one or more of the following features. For example, access of the first user to the digital image may be regulated by identifying a storage location associated with the first user, and modifying metadata associated with the first user. The storage location may be identified based upon an application of a hashing code to account information associated with the first user. Metadata to be modified includes metadata associated with the digital image, and modifying metadata may include removing metadata corresponding to the digital image from one or more tables associated with the first user. Modifying metadata may also include removing metadata corresponding to the first subscriber from one or more tables associated with the digital image.

In another implementation, access of a second user to the digital image may be regulated based on the notification received from the first user. In yet another implementation, access of an owner of the digital image to the digital image may be regulated. For example, the access of the owner of the digital image may be regulated by identifying a storage location associated with the owner and modifying metadata associated with the owner. The storage location may be identified based upon an application of a hashing code to account information associated with the owner. Modifying metadata may include modifying metadata associated with the digital image. Modifying metadata may also include removing metadata corresponding to the first user from one or more tables associated with the digital image. Moreover, modifying metadata also includes inserting metadata indicating an investigation status in one or more tables corresponding to the digital image.

Another implementation includes initiating an investigation of the digital image based on the notification received from the first user. The investigation may be initiated after receiving a number of complaints from one or more users exceeding a predetermined threshold. A level may be assigned to the digital image corresponding to the degree of offensiveness of the digital image determined by the investigation.

The storage location containing the digital image may be identified. In one implementation, the storage location maybe identified based upon account information associated with the first user. In another implementation, the storage location may be identified based upon account information associated with the owner. In yet another implementation, the storage location maybe identified based upon a first image identifier associated with a first storage facility and a directory and a second image identifier comprising a random number. Metadata associated with the stored digital image may be changed to effect restrictive access to the digital image by the first subscriber.

The digital image may be retrieved. The digital image may be reviewed, and action may be taken based upon the review of the digital image. For example, the action may include sending a warning notice to the owner of the digital image. The action may also include unsharing the digital image to prevent access to the digital image by one or more users, or replacing the offending digital image with a different digital image.

Other features and advantages will be apparent from the following description, including the drawings, and from the claims.

DETAILED DESCRIPTION

Computer system users are able to share digital images with each other, and an image service may be provided to facilitate the sharing of digital images. Typically, a user will create an online album of digital images and then invite one or more other users. to view the online album. While this feature of the image service allows families and friends to share life events captured with digital images, it introduces a potential for abuse. For instance, a user may be invited to view a digital image that he or she finds offensive. Typically, this situation arises when a user obtains a list of e-mail addresses through dubious means and mass invites the group of other users to view adult-oriented material.

To protect users, the image service may be configured to monitor digital images and receive notifications from users regarding offensive content. In one implementation, a monitoring system is configured to receive notifications of offending content from users and to take appropriate and automated actions in response to such notifications.

For the sake of brevity in the following description, several elements in the figures are represented as monolithic entities. However, these elements each may include numerous interconnected computers and components designed to perform a set of specified operations.

Figure 1:
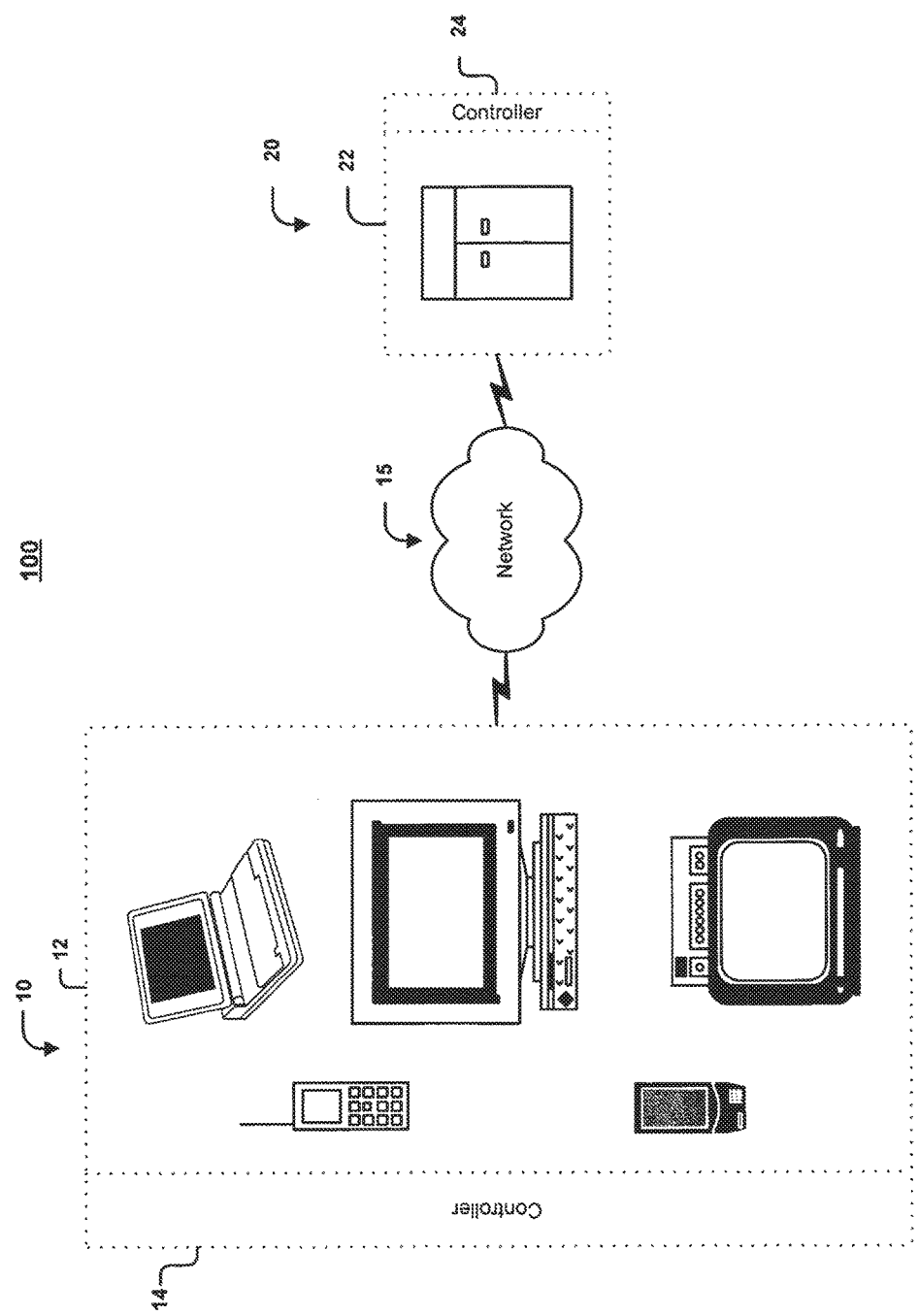
FIG. 1 is a block diagram illustrating aspects of a computer system.

FIG. 1 illustrates an exemplary computer system 100 for implementing techniques to process digital images. As shown, the computer system 100 includes a client system 10 connected through a network 15 to a host system 20. The client system 10 is configured to send requests and the host system 20 is configured to respond to requests.

In general, the client system 10 and host system 20 each include computer systems having hardware and/or software components for communicating across the network 15. The client system 10 and host system 20 each may include one or more general-purpose computers (e.g., personal computers and/or servers), one or more special-purpose computers (e.g., devices specifically programmed to communicate with each other), or a combination of one or more general-purpose computers and one or more special-purpose computers. The client system 10 and host system 20 may be structured and arranged to communicate using various communication protocols (e.g., HTTP, WAP) and encapsulation protocols (e.g., UDP) to establish connections (e.g., peer-to-peer) between network elements and/or to operate within or in concert with one or more other systems (e.g., the Internet and/or Web).

In one implementation, the client system 10 and the host system 20 each include a device (e.g., client device 12, host device 22) operating under the command of a controller (e.g., client controller 14, host controller 24). An example of a device is a general-purpose computer capable of responding to and executing instructions in a defined manner. Other examples include a special-purpose computer, a personal computer ("PC"), a workstation, a server, a laptop, a Web-enabled telephone, a Webenabled personal digital assistant ("PDA"), an interactive television set, a set top box ("STB"), video tape recorder ("VTR"), a digital video disc ("DVD") player, or any other component, machine, tool, equipment, or some combination thereof capable of responding to and executing instructions.

An example of a controller is a software application (e.g., operating system, browser application, microbrowser application, server application, proxy application, gateway application, tunneling application, e-mail application, instant messaging client application, online service provider client application, interactive television client application, and/or ISP client application) loaded on a device commanding and directing communications enabled by the device. Other examples include a computer program, a piece of code, an instruction, another device, or some combination thereof, for independently or collectively instructing the device to interact and operate as desired. The controller may be embodied permanently or temporarily in any type of machine, component, physical or virtual equipment, storage medium, or propagated signal capable of providing instructions to a device. In particular, the controller (e.g., software application and/or computer program) may be stored on a storage media or device (e.g., read only memory ("ROM"), magnetic diskette, or propagated signal) readable by a general or special purpose programmable computer, such that the functions described herein are performed if the storage media or device is read by a computer system.

The client system 10 is generally located at or on a device, such as, for example, a personal computer, operated or interfaced by a user who requests or submits information.

The host system 20 may include and/or form part of an information delivery network, such as, for example the Internet, the World Wide Web, an online service provider, and/or any other analog or digital wired and/or wireless network that provides information. Such an information delivery network may support a variety of online services including Internet and/or web access, e-mail, instant messaging, paging, chat, interest group, audio and/or video streaming, and/or directory services.

The network 15 may include one or more delivery systems for directly or indirectly connecting the client system 10 and the host system 20, irrespective of physical separation. Examples of delivery systems include, but are not limited to, a local area network ("LAN"), a wide area network ("WAN"), the Internet, the Web, a telephony network (e.g., analog, digital, wired, wireless, PSTN, ISDN, or xDSL), a radio network, a television network, a cable network, a satellite network, and/or any other wired or wireless communications network configured to carry data Each network may include one or more elements, such as, for example, intermediate nodes, proxy servers, routers, switches, adapters, and wired or wireless data pathways, configured to direct and/or deliver data.

The network 15 may include one or more delivery systems for directly or indirectly connecting the client system 10 and the host system 20, irrespective of physical separation. Examples of delivery systems include, but are not limited to, a local area network ("LAN"), a wide area network ("WAN"), the Internet, the Web, a telephony network (e.g., analog, digital, wired, wireless, PSTN, ISDN, or xDSL), a radio network, a television network, a cable network, a satellite network, and/or any other wired or wireless communications network configured to carry data Each network may include one or more elements, such as, for example, intermediate nodes, proxy servers, routers, switches, adapters, and wired or wireless data pathways, configured to direct and/or deliver data.

Figure 2:
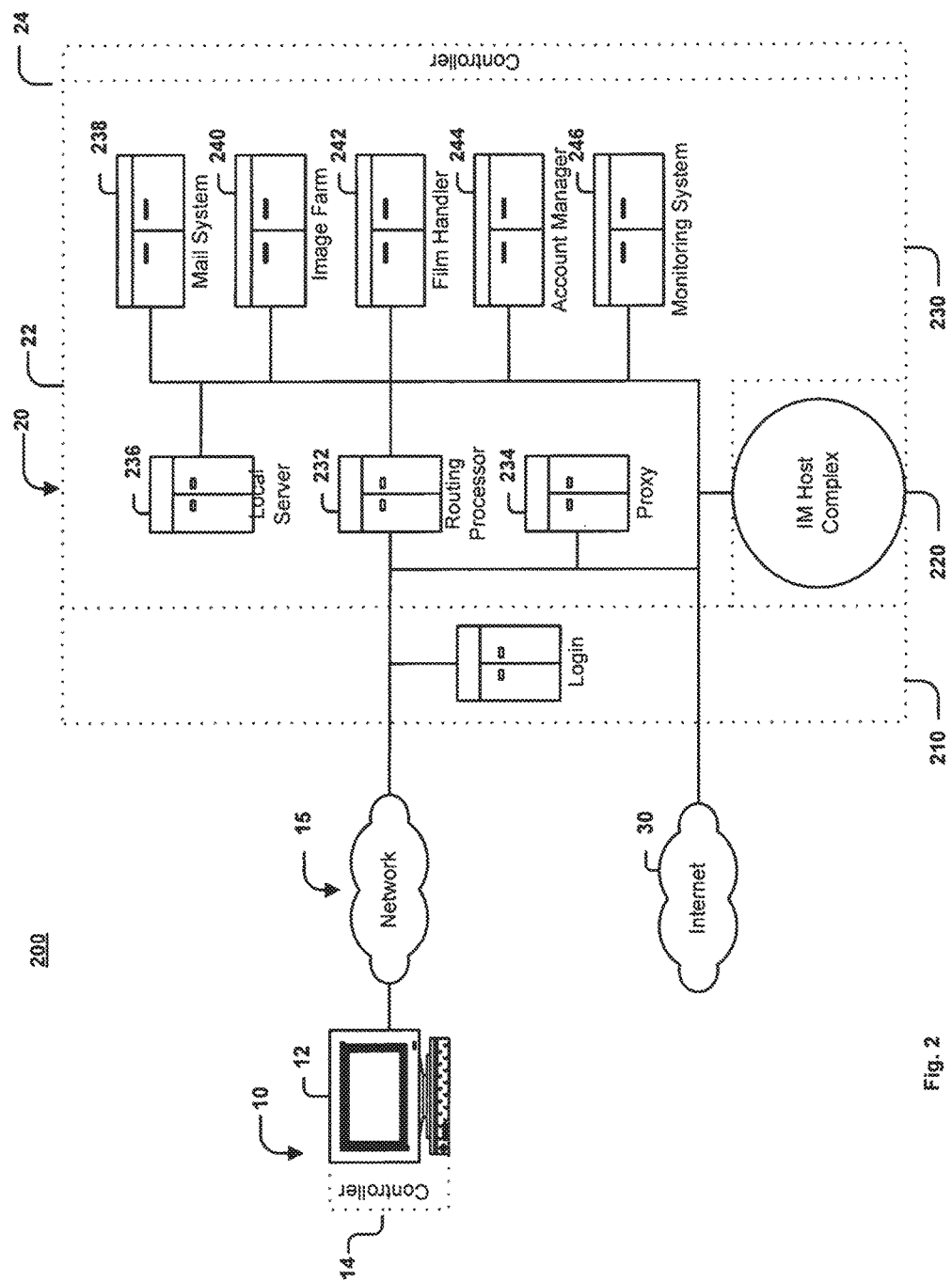
FIG. 2 is a block diagram expansion of aspects of FIG. 1.

Referring to FIG. 2, the communications system 200 is an expansion of the block diagram of FIG. 1, focusing primarily on one particular implementation of the host system 20. The host system 20 includes a host device 22 and a host controller 24. The host controller 24 generally is capable of transmitting instructions to any or all of the elements of the host device 22. For example, in one implementation, the host controller 24 includes one or more software applications loaded on the host device 22. In other implementations, the host controller 24 may include any of several other programs, machines, and devices operating independently or collectively to control the host device 22.

The host device 22 includes a login server 210 for enabling access by users and for routing communications between the client system 10 and other elements of the host device 22. The host device 22 also may include one or more host complexes, such as the depicted Instant Messaging ("IM") host complex 220 and Online Service Provider ("OSP") host complex 230. To enable access to these host complexes, the client system 10 includes communication software (not explicitly shown), for example, an IM client application, an OSP client application, and/or a browser application. The IM and OSP communication software applications are designed to facilitate interactions with the respective services and, in particular, may provide access to any or all of the services available within the respective host complexes. Furthermore, in one implementation, the login server 210 may initiate or facilitate one or more authorization procedures to enable independent or concurrent access to the IM host complex 220 and the OSP host complex 230.

The IM host complex 220 and the OSP host complex 230 may be connected through one or more gateways (not shown) that perform protocol conversions necessary to enable communications between the IM host complex 220, the OSP host complex 230, and the Internet 30. However, the IM host complex 220 generally is independent of the OSP host complex 230, enabling support of instant messaging services irrespective of network or Internet access. Thus, the IM host complex 220 allows users to send and receive instant messages, whether or not they have access to any particular ISP. The IM host complex 220 may support associated services, such as administrative matters, advertising, directory services, chat, and interest groups related to instant messaging. The IM host complex 220 is capable of enabling any or all of the machines logged into the IM host complex 220 to communicate with each other. To transfer data, the IM host complex 220 employs one or more standard or exclusive IM protocols.

Typically, the OSP host complex 230 supports different and non-instantaneous services, such as e-mail services, discussion group services, chat, news services, and Internet access services. In addition, the OSP host complex 230 may offer IM services independent of or based on IM host complex 220. The OSP host complex 230 generally is designed with an architecture that enables the machines within the OSP host complex 230 to communicate with each other and employs certain protocols (i.e., standards, formats, conventions, rules, and structures) to transfer data. For instance, the OSP host complex 230 ordinarily employs one or more OSP protocols and custom dialing or broadband engines to enable access by selected client applications. The OSP host complex 230 may define one or more specific protocols for each service based on a common, underlying proprietary protocol.

The OSP host complex 230 supports a set of services from one or more servers that communicate with the OSP host complex 230 and that may be physically located internal or external to the OSP host complex 230. For purposes of this discussion, servers external to the OSP host complex 230 generally may be viewed as existing on the Internet 30. Servers internal to the OSP complex 230 may be arranged in one or more configurations. For example, servers may be arranged in centralized or localized clusters in order to distribute servers and users within the OSP host complex 230.

In the implementation shown by FIG. 2, the OSP host complex 230 includes a routing processor 232. In general, the routing processor 232 will examine an address field of a data request, use a mapping table to determine the appropriate destination for the data request, and direct the data request to the appropriate destination. More specifically, in a packet-based implementation, the client system 10 may generate information requests, convert the requests into data packets, sequence the data packets, perform error checking and other packet-switching techniques, and transmit the data packets to the routing processor 232. Upon receiving data packets from the client system 10, the routing processor 232 may directly or indirectly route the data packets to a specified destination within or outside of the OSP host complex 230. For example, in the event that a data request from the client system 10 can be satisfied locally, the routing processor 230 may direct the data request to a local server 236. In the event that the data request cannot be satisfied locally, the routing processor 232 may direct the data request externally to the Internet 30 or the IM host complex 220.

The OSP host complex 230 also includes a proxy server 234 for directing data requests and/or otherwise facilitating communication between the client system 10 and the Internet 30. The proxy server 234 may include an Internet Protocol ("IP") tunnel capable of converting data between an OSP protocol and standard Internet protocol to enable the client system 10 to communicate with the public Internet 30, if appropriate.

The proxy server 234 also may allow the client system 10 to use standard IPs and formatting to access the OSP host complex 230 and the Internet 30. For example, the user may use an OSP TV client application having an embedded browser application installed on the client system 10 to generate a request in a standard IP format such as HTTP. In a packet-based implementation, data packets may be encapsulated inside a standard Internet tunneling protocol, such as, for example, User Datagram Protocol ("UDP"), and routed to the proxy server 234. The proxy server 234 may initiate a tunneling protocol, such as a Layer Two Tunneling Protocol ("L2TP") tunnel, to establish a point-to-point protocol (PPP) session with the client system 10.

The proxy server 234 also may act as a buffer between the client system 10 and the Internet 30, and may implement content filtering and time saving techniques. For example, the proxy server 234 can access parental controls settings established for the client system 10 or content requestor and enable requests and for transmission of content from the Internet 30 and other accessible content servers according to the parental control settings accessed. In addition, the proxy server 234 may include one or more caches for storing frequently accessed information, or may enable access to similar caches stored elsewhere. If requested data is determined to-be stored in the caches, the proxy server 234 may send the information to the client system 10 from the caches and avoid the need to access the content source, e.g., the Internet 30.

The OSP host complex 230 further includes a mail system 238, an image farm 240, a film handler 242, an account manager 244, and a monitoring system 246 in communication with each other as well as the other elements in the communications system 200.

The mail system 238 is configured to receive, store, retrieve, route, and deliver electronic mail ("e-mail") messages. In one implementation, the mail system 238 includes a system of folders or mailboxes associated with the users of the OSP host complex 230 and a massive storage area for storing the contents of e-mail messages including attachments to the e-mail messages. When the mail system 238 receives an e-mail message addressed to a particular user, the mail system stores the content and attachments of the e-mail message, inserts a link (e.g., href) or pointer corresponding to the storage location into the user's mailbox, and alerts the user of the new mail. The user opens the e-mail message by logging into the mailbox and selecting an icon including the link to the stored e-mail message. Similarly, a user may send an e-mail message by logging into the mailbox, generating an e-mail message, and then selecting a "send" button that causes the mail system 238 to store and forward the e-mail message to one or more intended recipients.

The image farm 240 is configured to receive, store, retrieve, route, and/or deliver digital images from developed rolls of film. The image farm 240 includes a system of storage servers and databases for storing digital images and metadata describing the digital images. Typically, digital images and metadata are stored in a distributed fashion across several storage facilities and/or databases. For example, digital images may be stored independently of the submitter and of the original film roll such that image data for a particular submitter or roll is maintained over several different storage facilities. More specifically, each of twenty-four pictures from a single roll may be stored at different storage facilities, or one or more may be stored at a single facility. Thus, the overall integrity of the image service provided by the OSP host complex 230 can be preserved even in the event of a catastrophic outage of several storage facilities. In addition, compromises to the security of a single server will not necessarily lead to access of more than one picture in a roll of film or by a particular submitter. Metadata describing the image data also may be distributed across a system of databases such that no one database is responsible for a disproportionate amount of metadata. The image farm 240 is described in greater detail below.

The film handler 242 is configured to receive and route digital images to the image farm 240 as well as update metadata maintained in the image farm 240. In general, upon receiving a collection of digital images, the film handler 242 transfers the image data to the image farm 240 for storage and updates metadata associated with the digital images. Typically, the film handler 242 receives digital images from a user or from a third party (e.g., film developer) associated with the user of the OSP host complex 230. For example, the film handler 242 may receive one or a collection of digital images created with a digital camera from a user. The user may upload the digital images using one or more software applications provided by the OSP host complex 230 or the digital camera manufacturer. Alternatively, the film handler 242 may receive a collection of digital images from a film developer that received an undeveloped roll of film from a user, developed the roll of film, created digital images from the developed roll, and sent the digital images to the film handler 242.

In one implementation the film handler 242 includes application server logic (e.g., Netscape Application Server (NAS) logic or Java Server (KJS) logic) for maintaining a pool of database connections for high performance accesses into databases in the image farm 240. The film handler 242 also may include a hash value-to-database function library for determining where database reads and writes occur within the databases. While the film handler 242 is depicted in FIG. 2 as being external to the image farm 240, in another implementation, the film handler 242 may reside as an application (e.g., Java applet) running within the image farm 240.

The account manager 244 is configured to maintain an image service account for the users of the OSP host complex 230. In general, the account manager 244 creates new accounts by requesting information from and inserting submitted account information into account tables maintained in the image farm 240. In one implementation the account manager 244 includes application server logic (e.g., Netscape Application Server (NAS) logic or Java Server (KJS) logic) for maintaining a pool of database connections for high performance accesses into databases in the image farm 240. The account manager 244 also may include a hash value-to-database function library for determining where database reads and writes occur within the databases. In general, the account manager 244 creates an image service account and populates a certain account table in the image farm 240. The account manager 244 also may automatically generate certain account information (i.e., fields) based on the information submitted from users. In addition, the account manager 244 may be configured to authenticate users logging in to the image service, deliver path information (e.g., linking information) to users in response to requests for various image service features, and transmit purging information in response to complaints received from users.

The monitoring system 246 is configured to locate and remove stored images that violate policies established by administrators of the OSP host complex 230. In general, the policies regulate the type of content that is acceptable for sharing among users. While the OSP host 230 provides users with the ability to share digital images with other users, the monitoring system 246 is designed to temper that ability in order to protect users from viewing offensive content. Although the monitoring system 246 may act proactively by filtering submitted digital images and deleting digital images that are deemed offensive, the monitoring system 246 typically is configured to receive notifications of offending content from users and take appropriate actions in response. The monitoring system may take different levels of action depending upon the nature of the offending content. Such actions may range, for example, from blocking the complaining user from reviewing the offending digital image to deleting the digital image, canceling the offender's account, and alerting law enforcement authorities. The monitoring system 246 is described in greater detail below.

The separate illustration and description of host complex items, such as the routing processor, 232, proxy server 234, local server 236, mail system 238, image farm 240, film handler 242, account manager 244, and monitoring system 246, is not to imply the distinction of hardware and/or software used to enable those items. Rather one or more of these items may be combined.

Figure 3:
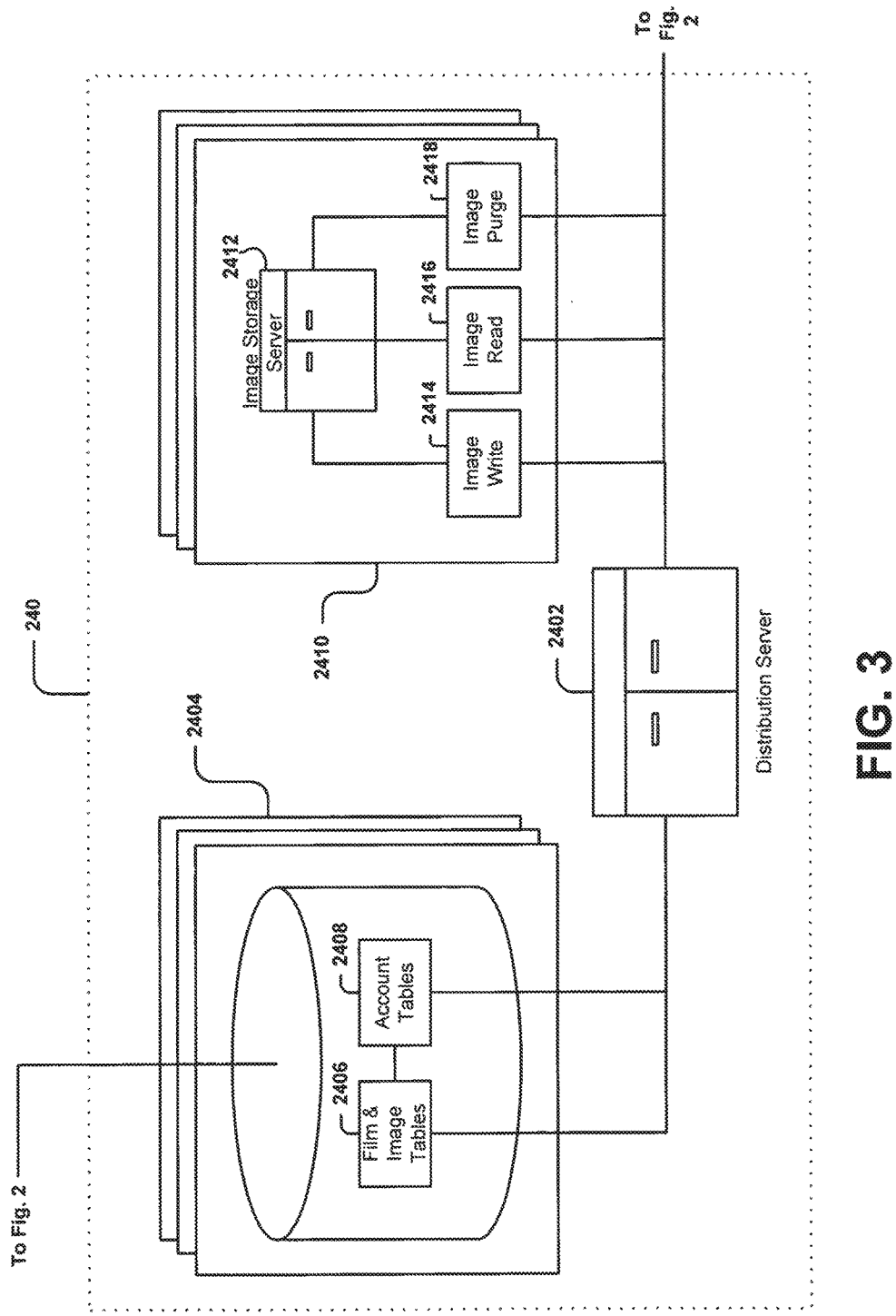
FIG. 3 is a block diagram expansion of aspects of FIG. 2

FIG. 3 is one implementation of the image farm 240 of FIG. 2. As shown, the image farm 240 includes a distribution server 2402 in communication with several image farm databases 2404. Each image farm database 2404 includes several tables (e.g., film and image tables 2406 and account tables 2408) for maintaining information associated with received digital images and the users of the OSP host complex 230. In general, the distribution server 2402 is configured to identify storage locations within the image farm databases 2404. The distribution server 2402 may communicate with and receive information (e.g., image metadata) from various other elements of the OSP host complex 230 of FIG. 2, including, e.g., the mail system 238, the film handler 242, the account manager 244, and the monitoring system 246. The distribution server 2402 also is configured to insert, update, and/or delete information from identified storage locations. For example, the distribution server 2402 may receive metadata from the film handler 242, identify a storage location in the image farm database 2404 based on the metadata, and insert the metadata into an appropriate table at the identified storage location. The distribution server 2402 also may receive metadata from the monitoring system 246, identify a Storage location in the image farm database 2404 based on the metadata, and delete/replace stored metadata from an appropriate table at the identified storage location.

The image farm 240 further includes an image storage server system 2410 having an image storage server 2412, an image write server 2414, an image read server 2416, and an image purge server 2418. In general, the image write server 2414 is configured to insert image data into the image storage server 2412, the image read server 2416 is configured to retrieve image data from the image storage server 2412, and the image purge server 2418 is configured to delete image data from the image storage server 2412.

The image storage server system 2410 may communicate with and respond to various elements of FIG. 2, including the client system 10, the film handler 242, the account manager 244, and the monitoring system 246. Servers (e.g., image write server 2414, image read server 2416, and image purge server 2618) of the image storage server system 2410 may function in response to a communication from the client system 10, the film handler 242, the account manager 244, and/or the monitoring system 246. For example, the image write server 2414 may generate metadata and store image data in the image storage server 2412 in response to a communication from the film handler 242. The image read server 2416 may retrieve image data in response to a communication from a client system 10 according to path information provided by the account manager 244. The image purge server 2418 may delete image data in response to a communication from the monitoring system 246.

In one implementation, each image storage server 2412 may store digital images according to the following directory structure:

host:/ data/ AAA/BB/CC/DD/EE/ID_ N.type.

In this pneumonic directory structure, host identifies a particular image storage server 2412 (root directory) for storing a digital image, data identifies a static directory of the image storage server 2412, AAA is a three hexadecimal character directory identifier denoting a main storage directory of the image storage server 2412, BB, CC, DD, and EE are each two hexadecimal character subdirectories in the image storage server 2412, ID is an encrypted 32 hexadecimal character image identifier that provides a file name and contains location information, N is the largest pixel dimension of an image (width or height), and type identifies image type (e.g., jpg).

By design, the above directory structure limits the number of files that can exist in one subdirectory while still establishing enough subdirectories so that the system will be relatively sparse. With this directory structure, for example, an image storage server 2412 may be designed with limits of 256 images and 256 subdirectories (designated by two hexadecimal digits) within a single tier. The file systems are mounted below the server root directory at the/data/AAA level. This ensures that the AAA level as well as the host level will be relatively sparse, while the BB, CC, DD and EE levels will be heavily populated. In one implementation, IDs are varied over the BB and host range quickly. The ID field resides beneath the EE level, since ID is a unique identifier and only one file will have that unique path. The directory structure is very robust, enabling each file system to store in excess of two billion images, even if only IDs are considered. It should be noted that the specific numerical values provided are exemplary only.

Figure 4:
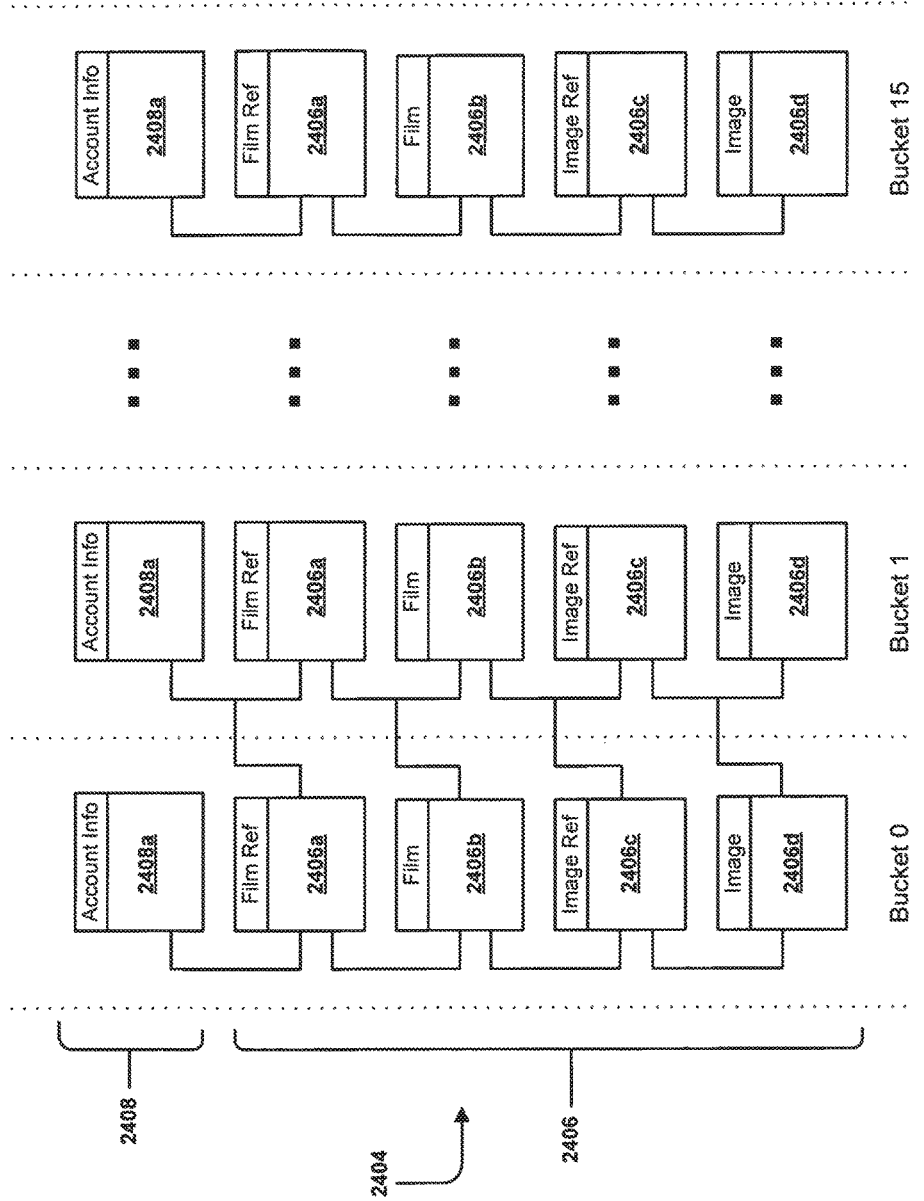
FIG. 4 is a block diagram expansion of aspects of FIG. 2

FIG. 4 provides further detail regarding the image farm databases 2404 of FIG. 3. As shown, the image farm databases 2404 are separated into multiple storage space groups referred to as "buckets." In one implementation, the image farm databases 2404 are separated into sixteen relatively equal-sized buckets (bucket 0-bucket 15). As described above, each image farm database 2404 maintains information associated with received digital images and the users of the OSP host complex 230. This information is received by the image farm databases 2404 and is stored within the film and image tables 2406 and account tables 2408 in a distributed fashion. Namely, the information received by the image farm databases 2404 is relatively uniformly distributed across more than one or all buckets. Distributing information across multiple storage spaces areas in this way eliminates the need to scan across multiple databases for the most common image service operations offered by the OSP host complex 230.

In one implementation, relatively uniform distribution across all buckets is accomplished by applying an OSP proprietary hashing code to at least one field in the received information. Application of the OSP proprietary hashing code returns a unique hash value. The hash value then is transformed into a bucket number corresponding to one of the relatively equal-sized buckets. The information is routed to the appropriate bucket, each bucket containing sets of film and image tables 2406 and account tables 2408 configured to store the received information in appropriate fields.

Each of the bucketed image farm databases 2404 includes film and image tables 2406 and account tables 2408. In one implementation, the film and image tables 2406 include a film reference table 2406a containing sharing information related to a film, a film table 2406b for describing a collection of images, an image reference table 2406c containing information showing that an image has been used to construct a film, an image table 2406d for describing a particular image, a film attributes table (not shown) for storing future or less common roll/album properties that are not included in the film table, an image attributes table (not shown) for storing future or less common properties that are not included in the image table, a film identification counter (not shown) that may be used to generate a unique film identifier without the need for an external server, and an image copyright table (not shown) for flagging images that have copyright information bound to them. The account tables 2408 include an account information table 2408a for storing account information associated with a particular user.

The film reference table 2406a may include information such as: film identifiers, reference owner, shared by name, buddy name, film reference identifier, film type, number of images, title, share type, access control, modification date, first viewed date, and view flag. In one implementation, fields for the film identifiers, reference owner, shared by name, buddy name, and film reference identifier are designated as primary keys for sorting and searching the film reference table as well as for establishing relationships among the film reference table and other tables and/or databases.

The film table 2406b may include information such as: film identifiers, owner name, film type, number of images, creation status, creation date, modification date, expiration date, external film identifier, owner key, reference counter, access control, purge flags, title, description, background pattern, layout, or other attributes. In one implementation, fields for the film identifiers are designated as primary keys for sorting the film table as well as for establishing relationships among the film table and other tables and/or databases.

The image reference table 2406c may include information such as: film identifiers, image identifiers, image version, image counter, sequence number, image hash value, caption, creation date, modification date, frame type, image type, resolution, maximum width, maximum height, access control, purge flags, and branding identifier. In one implementation, fields for the film identifiers, image identifiers, image version, image counter and the sequence number are designated as primary keys for sorting the image reference table as well as for establishing relationships among the image reference table and other tables and/or databases.

The image table 2406d may include information such as: image identifiers, image version, original owner, image type, resolution, maximum width, maximum height, access control, purge flags, branding identifier, creation status, creation date, modification date, reference counter, external film identifier, external user name, external filename, source identifier, rotation angle, archived flag, copyright flag, and attribute flag. In one implementation, fields for the image identifiers and image version are designated as primary keys for sorting the image table as well as for establishing relationships among the image table and other tables and/or databases.

The film attributes table may include information such as: film identifiers, image version, attribute type, and attribute string. In one implementation, fields for the film identifiers, image version, and attribute type are designated as primary keys for sorting and searching the film attributes table as well as for establishing relationships among the film attributes table and other tables and/or databases.

The image attributes table may include information such as: image identifiers, image version, attribute type and attribute string. In one implementation, fields for the image identifiers, image version and attribute type are designated as primary keys for sorting the image attributes table as well as for establishing relationships among the image attributes table and other tables and/or databases.

The film identification counter may include information such as: hash value and identifier counter. In one implementation, the field for the hash value is designated as the primary key for sorting the film identification table as well as for establishing relationships among the film identification table and other tables and/or databases.

The image copyright table may include information such as: image identifiers, image version, line number, and copyright information. In one implementation, fields for the image identifiers, image version and line number are designated as primary keys for sorting the image copyright table as well as for establishing relationships among the image copyright table and other tables and/or databases.

The account information table 2408a may include information such as: account name (e.g., screen name), a unique identifier (e.g., hash value) associated with the account name, image storage space used, image storage space available, account type, billing cycle, account creation date, modification date, account preferences, number of rolls, number of albums, number of shared accounts (e.g., buddies), notification flags concerning offensive content, pertinent dates (e.g., last login, last roll received, last image uploaded, last album shared, last mail received, last mail sent, welcome kit received), and/or other information. In one implementation the account name is designated as the primary key for sorting the account information table as well as for establishing relationships among the account information table and other tables and/or databases.

Figure 5:
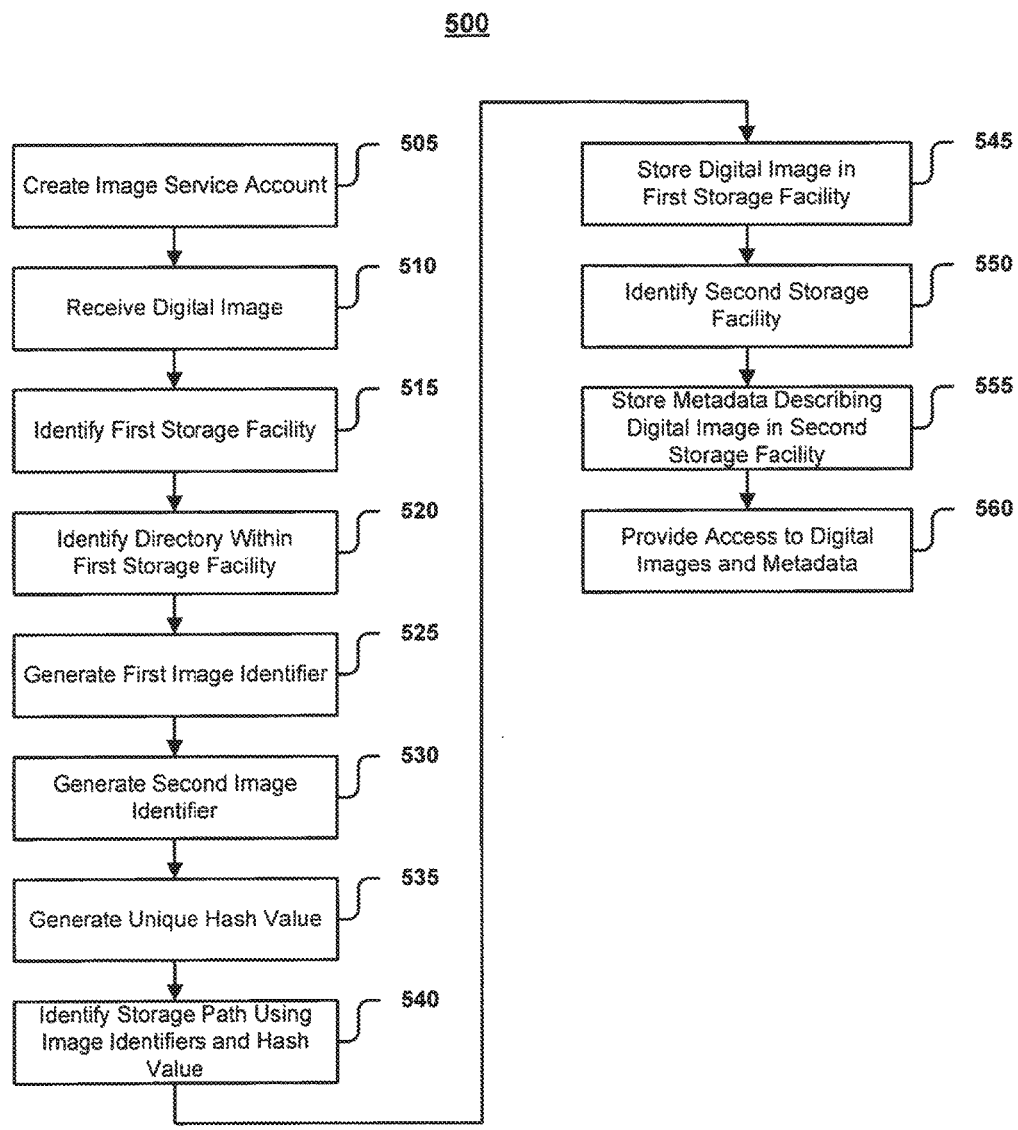
FIG. 5 is a flowchart of a method that may be implemented by a computer system such as the computer system illustrated by FIGS. 1-4.

Referring to FIG. 5, a procedure 500 for monitoring and providing access to digital images may be implemented by a computer system 100 such as, e.g., that illustrated and described with respect to FIGS. 1-4. That said, the procedure 500 may be implemented by any suitable type of hardware (e.g., device, computer, computer system, equipment, component); software (e.g., program, application, instructions, code); storage medium (e.g., disk, external memory, internal memory, propagated signal); or combination thereof.

Initially, a new image service account is created (step 505). In general, the host system 20 creates image service account for users. In one implementation, the host system 20 includes an OSP host complex 230 that receives subscriptions from users and offers image services as part of a package of online service available to users. Typically, the host system 20 (e.g., account manager 244) automatically creates an image services account for a user at the time of OSP subscription. In other implementations, the host system 20 may offer image services to customers of a film-processing partner regardless of the customers' ISP. In such implementations; the host system 20 (e.g., account manager 244) may prompt the user to enter account information through a user interface or it may obtain information electronically from storage at the host 20 or another accessible system.

Creating an image service account 505 may involve automatically generating certain account information (i.e., fields). For example, typical account information may include but is not limited to, account name (e.g., screen name), a unique identifier (e.g., hash value) associated with the account name, image storage space used, image storage space available, account type, billing cycle, account creation date, modification date, account preferences, number of rolls, number of albums, number of shared accounts (e.g., buddies), notification flags concerning offensive content, pertinent dates (e.g., last login, last roll received, last image uploaded, last album shared, last mail received, last mail sent, welcome kit received), and/or other personal information (e.g., mailing address, phone number, instant message contacts, e-mail contacts). In general, the host system 20 (e.g., account manager 244) may be configured to automatically detect and update information to populate these fields with little or no input required by the user.

Creating an image service account 505 also may involve storing and/or accessing account information in a distributed fashion. In general, the account information is maintained on the host system 20 in massive storage facilities. In one implementation, the host system 20 includes an image farm 240 and an account manager 244 for populating the image farm 240. The image farm 240 includes a plurality of image farm databases 2404 for storing account information in account tables 2408. Each of the image farm databases 2404 may be assigned to one of a plurality of storage space groups (e.g., buckets). Account information is relatively uniformly distributed to a particular storage space group, i.e. bucket, and stored in an appropriate table (e.g., account information table 2408a) in one of the bucketed image farm databases 2404.

Distributing the account information to an appropriate storage space group may include determining a unique hash value by encoding the account information. For example, the account name (e.g., screen name) associated with a user may be encoded using a proprietary OSP hashing code. In one implementation, the host system 20 (e.g., account manager 244) applies a hashing code that involves multiplying the individual ASCII values of the characters in the screen name by certain prime numbers, summing them, and returning a value modulo 64K (i.e., a 16-bit unsigned integer value between 0-65535). The returned hash values are mapped in round-robin fashion to the storage space groups, i.e., buckets, according to Table 1.

TABLE 1

| Hash Value | Bucket |
| --- | --- |
| 0 | 0 |
| 1 | 1 |
| 2 | 2 |
| 3 | 3 |
| 4 | 4 |
| 5 | 5 |
| 6 | 6 |
| 7 | 7 |
| 8 | 8 |
| 9 | 9 |
| 10 | 10 |
| 11 | 11 |
| 12 | 12 |
| 13 | 13 |
| 14 | 14 |
| 15 | 15 |
| 16 | 0 |
| 17 | 1 |

At any time after creating the image service account (step 505), the host system 20 (e.g., account manager 244) may update and/or delete the image service account. In general, the user may actively request the host system 20 to update or cancel an image service account by logging in and requesting an update or cancellation. The host system 20 also may delete a user's account due to inactivity. For example, the host system 20 may remove an image service account that has been idle if a user has not developed a roll within the last X (e.g., 6) months, uploaded an image within the last Y months, shared an image (e.g., by e-mail or by sharing an album) within the last Z months, or logged in the image service feature within the last ZZ months, where X, Y, Z, and ZZ are threshold values of time which may be the same or which may differ from one another. Of course, the timing on these activities should be flexible to allow business to adjust as market conditions demand. In addition, the host system 20 may delete a user's account due to a policy violation. For example, sharing inappropriate digital images may result in cancellation or regulation of a user's image service account, as discussed in greater detail below.

Following the creation of an image service account (step 505), one or more digital images associated with a user are received (step 510). In general, a host system 20 receives digital images associated with a user. To this end, the host system 20 may include a film handler 242 configured to receive digital images from a user or from a third party (e.g., film developer) associated with the user. For example, the film handler 242 may receive one or a collection of digital images from a user or from a third party (e.g., film developer). For images received from a third party, each of the digital images may have a preset maximum resolution (e.g., 768.times.512 pixels) for incoming rolls. For user-uploaded images, the size of the digital images may be variable with no preset maximum resolution.

After one or more digital images are received (step 510), a first storage facility for storing a digital image is identified (step 515) through selection or through access to a previous selection. In general, the host system 20 identifies a first storage facility for storing a digital image. In one implementation, the host system 20 includes an image storage server system 2410 having a plurality of image storage servers 2412 configured to store digital images. The host system 20 further includes a film handler 242 that identifies one of the plurality of image storage servers 2412 as being available to store a digital image. For example, the film handler 242 may access a configuration file that contains a complete list of image storage servers 2412 and selects particular image storage servers 2414 in round-robin fashion. After selecting a particular image storage server 2412, the film handler 242 may communicate with the image write server 2414 and confirm that the image storage server 2412 is capable of storing the digital image.

After the first storage facility has been identified (step 515), a directory within the first storage facility is identified for storing a digital image (step 520). In general, the host system 20 identifies a directory in the first storage facility. In one implementation, the host system 20 includes a plurality of image storage servers 2412, each image storage server 2412 having a directory structure for storing digital images. Typically, the directory structure for an image storage server 2412 will include several tiers identifying the storage facility, a directory, and several subdirectories. The host system 20 may include a film handler 242 that identifies one of the plurality of directories within a particular image storage server 2412 as being available to store a digital image. For example, the film handler 242 may access a configuration file that contains a complete list of first tier directories associated with each image storage server 2412. The film handler 242 may select particular first tier directories in the image storage server 2412 using load balancing algorithms and techniques, such as the well-known round-robin approach. After selecting a particular first tier directory, the film handler 242 confirm that the particular image storage server 2412 is capable of storing the digital image within the particular first tier directory and communicate this information to the image write server 2414.

After a particular directory within the storage facility has been identified (step 520), a first image identifier is generated (step 525). In general, the host system 20 generates a first image identifier associated with the identified storage facility and directory. In one implementation, the host system 20 includes an image write server 2414 that generates a first image identifier corresponding to the identified storage facility and the identified directory. One example of a first image identifier is an 8 hexadecimal (32 bit) character string in which the first three hexadecimal characters correspond to the storage facility, the next three hexadecimal characters correspond to the directory, and the last two hexadecimal characters correspond to an encryption method. Typically, the groups of hexadecimal characters corresponding to the storage facility, directory, and encryption are coded. To illustrate, an example of a first image identifier (image_id_p1) is FEDCBA98. In this illustration, the characters FED correspond to a particular storage facility, for example, the image storage server 2412 named ygppics-dO1.blue.isp.com. The characters CBA correspond to a directory within the particular storage facility, for example, the main storage directory 010. And, the characters 98 correspond to an encryption method, for example, the MD5 algorithm or DEC algorithm.

Next, a second image identifier is generated (step 530). In general, the host system 20 generates a second image identifier for determining particular subdirectories of the identified storage facility. In one implementation, the host system 20 includes an image write server 2414 that generates a second image identifier using a random number generator. One example of a second image identifier is a randomly-generated 8 hexadecimal (32 bit) character string. To illustrate, an example of a second image identifier (image_id_p2) is 76543210. Typically, the image write server 2414 will generate random numbers.

Then, a unique hash value is generated by encrypting the first and second image identifiers (step 535). In general, the host system 20 encrypts the first and second image identifiers and returns a hash value. In one implementation, the host system 20 includes an image write server 2414 that encrypts the first and second image identifiers according to a selected encryption method (e.g., MD5, DEC). One example of an encryption method involves applying the MD5 algorithm to the first and second image identifiers represented as a single character string (e.g., a single 16 hexadecimal character string). To illustrate according to the above example, the first image identifier (image id p1) and the second image identifier (image_id_p2) can be represented as the 16 hexadecimal character string, e.g., FEDCBA9876543210. A unique hash value is returned when the MD5 algorithm is applied to this character string.

In general, encrypting the first and second image identifiers returns an expanded hash value having more characters than the first and second image identifiers. In one implementation, the first and second image identifiers each include 8 hexadecimal characters and the retuned hash value is a unique 32 hexadecimal character string value. To illustrate, assume that a trivial encryption method involves simply inserting random characters into a 16 hexadecimal characters string (image_id_p1 image_id_p2) to create a 32 hexadecimal character string. In such as case, the result of encrypting the first image identifier (image_id_p1) and the second image identifier (image_id_p2) could be the unique image identifier (ID): F1E2D3C4B5A69788796A5B4C3D2E1FO. Of course, in practice implementations, more elaborate hashing algorithms, such as the MD5 algorithm and/or the DES algorithm, may be utilized so that the resulting hash value gives no clear indication of the type of encryption algorithm being employed, or more simplistic security protocols or hashing algorithms may be applied to simplify the process or procedure.

Next, a storage path is identified using the first and second image identifiers and the unique hash value (step 540). In general, the host system 20 identifies a storage path for the digital image using the first and second image identifiers and the unique hash value.

As described above, each storage server 2412 may store digital images according to the following directory structure:
  host:/ data/ AAA/BB/CC/DD/EE/ID_ N.type In this pneumonic directory structure, host identifies a particular image storage server 2412 (root directory) for storing a digital image, data identifies a static directory of the image storage server 2412, AAA is a three character directory identifier denoting a main storage directory of the image storage server 2412, BB, CC, DD, and EE are each two character subdirectories in the image storage server 2412, ID is an encrypted character image identifier that provides a file name and contains location information, N is the largest pixel dimension of an image (width or height), and type identifies image type (e.g., jpg).

Identifying the storage path may include extracting storage path information from the first and second image identifiers, for example, using an image write server 2414 such as that shown by FIG. 3. In one example, the first image identifier (image_id_p1) is FEDCBA98 and the second image identifier is 76543210. These characters may represent an encoded path (e.g., href) of a storage location in the image storage server 2412. The host system 20 (e.g., image write server 2414) may extract path information from the first and second image identifiers as follows: FED=host, CBA=AAA, 98=encryption code (encryption used to obtain the hash value), 76=BB, 54=CC, 32=DD, and 10=EE.

Identifying the storage path may involve translating the extracted path information using a decoder (e.g., a look up table). Again using the example from above in which the first image identifier is FEDCBA98 and the second image identifier is 76543210, the decoder may translate the host characters FED into the server name ygppics-dO 1. blue.isp.com, the AAA characters CBA into the main directory 101, the BB characters 76 into the first subdirectory 05, the CC characters 54 into the second directory 72, the DD characters 32 into the third subdirectory FA, and the EE characters 10 into the fourth subdirectory CB.

Identifying the storage path further may include using the unique hash value as a filename. As described above, encrypting the first and second image values returns a unique filename. This unique hash value may be used as a unique image identifier (ID) that defines a unique file name and location for the image data. In one example, assuming the largest pixel value is 96 and the digital image is jpg type, the resulting path (href) in this case would be:
http://ygppics-dO1.blue.aol.com/data/O 10/05/72/F A/CB/ hashvalue 96.jpg.

From the above, it is evident that the determination of a storage path may be made independent of typical image identifiers (e.g., account name, film roll identifier, date received). It follows, therefore, that related digital images (e.g., same account name, same film roll identifier, same date received) may have unrelated storage paths. For example, digital images from the same roll of film generally will have storage paths corresponding to different image storage servers 2412, different directories, and different subdirectories. As such, the failure of one storage facility should have reduced impact on the service of any particular user. Furthermore, in the unlikely event that the storage location of a particular image is obtained or determined without authorization (e.g., hacked), the decoded location of one image will give no indication of the storage location of any other related images. Consequently, the overall security of the image service is improved.

After the storage path is identified (step 540), the digital image is stored at the identified storage path (step 545). In general, the host system 20 stores a digital image at the identified storage path. In one implementation, the host system 20 includes an image write server 2414 that receives a digital image from a film handler 242 and stores the digital image in a particular image storage server 2412 at the identified storage path. Where the storage location is derived from a unique hash value, the storage location will be unique to that particular digital image.

Storing the digital image may include generating and storing lower resolution thumbnails. In general, the host system 20 generates the lower resolution thumbnails. In one implementation, the host system 20 includes an image write server 2414 that uses a thumbnail function that creates thumbnails by ripping lower resolution images directly from a digital image in the directory in which it was stored. The thumbnail function may rip and return a 96.times.64 pixel thumbnail or 160.times.107 pixel thumbnail, for example. The thumbnails may be given names based upon the passed in ID and the resolution. Therefore, the lower resolution thumbnails may be stored in the exact same path as the path of the original.

After the digital image has been stored (step 545), a second and perhaps different storage facility may optionally be identified for storing metadata describing the digital image (step 550). In one implementation, the host system 20 includes a film handler 242 configured to identify an appropriate image farm database 2404 separate from the image storage server system 2410. Identifying an appropriate storage space may include determining a storage space group containing the appropriate image farm database 2404 from account information associated with the stored digital image. For example, the account name (e.g., screen name) associated with a user may be encoded using a proprietary OSP hashing code. In one implementation, the film handler 242 applies the same proprietary hashing code to the user's screen name as described above and is mapped by the distribution server 2402 to the appropriate storage space group, i.e., bucket, containing the image farm database 2404.

Then, metadata describing a digital image is stored in the second storage facility (step 555). In general, the host system 20 stores the metadata describing a digital image. In one implementation, the host system 20 includes bucketed image farm databases 2404 including film and image tables 2406 and account tables 2408 for storing metadata. The image farm databases 2404 and tables may be separate from the image storage server system 2410, and generally contain metadata describing and pointing to the digital images stored in the image storage server system.

Storing metadata may include storing the first and second image identifiers in appropriate film and image tables 2406 (e.g., film reference table 2406*a*, film table 2406*b*, image reference table 2406*c*, image table 2406*d*). As described above, the stored first and second image identifiers may be used to identify a unique filename and storage location of a digital image stored in the image storage server system 2410. Storing metadata also may include automatically creating new records, generating certain metadata (e.g., unique film identifier, copyright attribute), and storing the metadata in appropriate film and image tables 2406. For example, the film handler 242 or a stored procedure in the film and image tables 2406 may be used to generate a unique film identifier. Storing metadata also may include updating account information stored in account tables 2408. For example, when a new digital image is stored, the film handler 242 may update counters in the account table 2408*a* of a particular user for number of rolls or number of albums.

Finally, access to digital images and metadata describing the digital images is provided (step 560). In general, the host system 20 provides access to digital images and metadata to users and/or other elements within the host system 20, such as the account manager 244 and the monitoring system 246, for example. In one implementation, the image farm databases 2404 communicate with and providing information (e.g., path information) to various elements of the OSP host complex 230 of FIG. 2 including the account manager 244.

Providing access to digital images and metadata describing the digital images may include allowing users to view one or more digital images. In general, the film and image tables 2406 are searchable by various criteria (e.g., primary keys) including screen name. For example, by passing a user's screen name to the film and image tables 2406, the account manager 244 can retrieve image records and/or film records associated with the user's account. Typically, the retrieved records will include image identifiers referencing one or more stored digital images. The account manager 244 can use the image identifiers (e.g., image_id_p1 and image_id_p2) to determine the storage path of a particular digital image stored in a particular image storage server 2412 within the image storage server system 2410, as described above. By navigating to the appropriate storage path in the image storage server system 2410, the account manager 244 can retrieve and display a particular digital image or set of images to a user.

Providing access to digital images and metadata also may include allowing users to list and view all rolls for a screen name passed as a search parameter, to list and view all albums for a screen name passed as a search parameter, to list and view all buddy albums for the screen name passed as a parameter, and/or to list all images for a film identifier passed as a parameter. After listing and viewing certain digital images, rolls, and albums, a user may edit and/or delete any or all of the digital images, rolls, and albums.

Providing access to digital images and metadata also may include allowing users to share a roll or album. In general, the host system 20 allows users to share digital images. In one particular implementation, the account manager 244 shares a digital image by taking film identifier and buddy screen name as arguments, locating a film reference table 2406*a* in the owner's storage space group (e.g., bucket), creating a new record in the owner's film reference table, accessing a film reference table 2406*a* in the buddy's storage space group (e.g., bucket), creating a record in the buddy's film reference table, and incrementing the number of buddies field in the account information table 2408 a in the buddy's storage space group.

Figure 6:
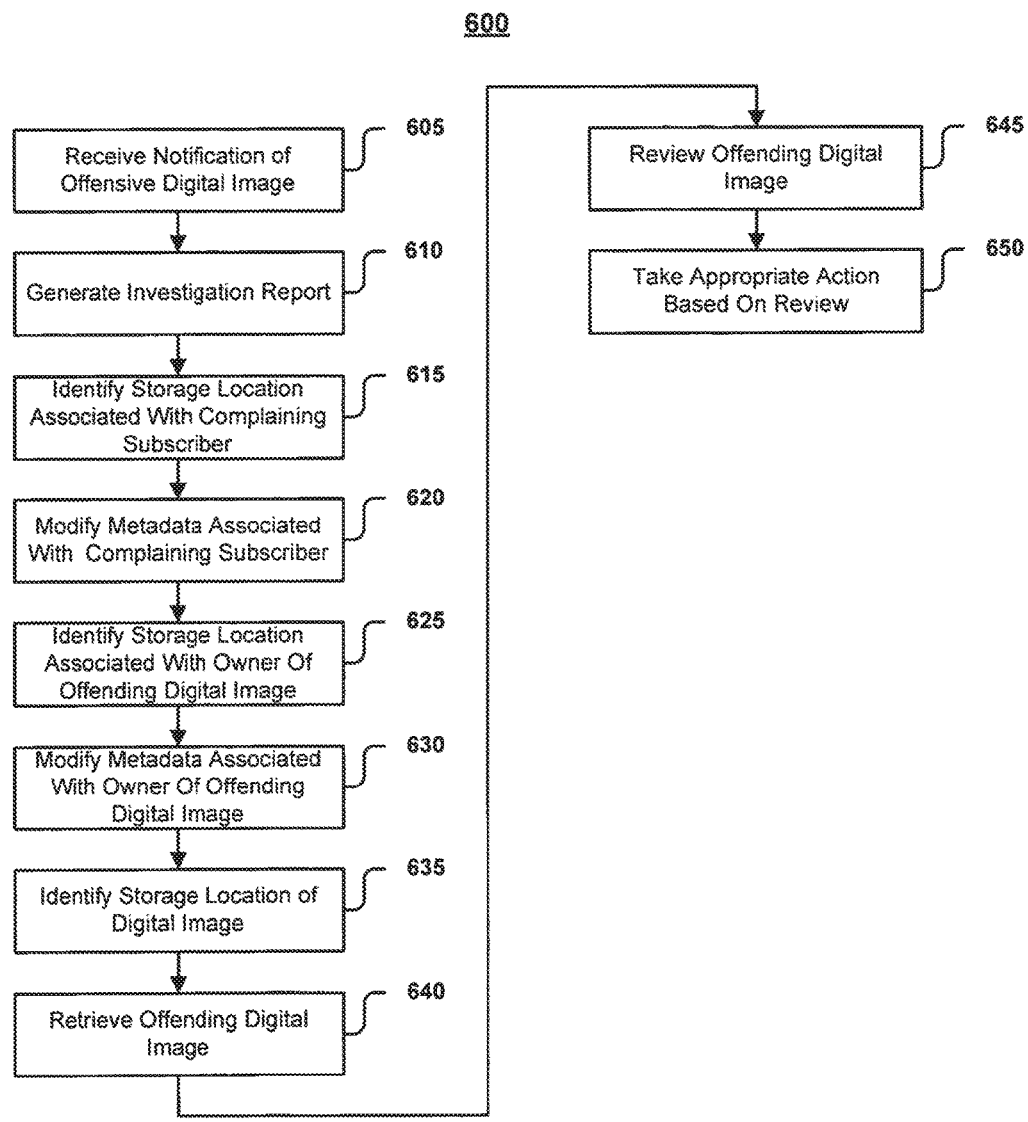
FIG. 6 is a flowchart of another method that may be implemented by a computer system such as the computer system illustrated by FIGS. 1-4.

Referring to FIG. 6, a procedure 600 for monitoring and providing access to digital images may be implemented by a computer system 100 such as, e.g., that illustrated and described with respect to with FIGS. 1-4. That said, the procedure 600 may be implemented by any suitable type of hardware (e.g., device, computer, computer system, equipment, component); software (e.g., program, application, instructions, code); storage medium (e.g., disk, external memory, internal memory, propagated signal); or combination thereof.

As described above, users are able to share digital images with each other. Typically, an owner will create an online album of digital images and then invite one or more other users to view the online album. An invitation may be extended to the one or more other users by an e-mail message. For example, the owner may assemble a list of invited users through the use of an "invite" feature or otherwise. Elements of the host system 20 (e.g., mail system 238, account manager 244) may react actively to the owner's invitation by sending access information (e.g., storage path/link and password via email) to each of the invited users, or they may react passively by merely enabling invitees for future access based on and in response to requests for such access.

While this feature of the image service allows families and friends to share life events captured with digital images, it introduces a potential for abuse. For instance, a user may be invited to view a digital image that he or she finds offensive. Typically, this situation arises when an owner obtains a list of e-mail addresses through dubious means and mass invites the group to view adult-oriented material.

To protect users, the host system 20 is configured to receive notifications from users regarding offensive content. In one implementation, the host system 20 includes a monitoring system 246 configured to receive notifications of offending content from users and to take appropriate and automated and/or semi-automated actions in response to such notifications.

Initially, a notification regarding offensive content is received (step 605). In general the host system 20 enables or communicates with a user interface allowing users transmit notifications. For example, shared albums may include a "notify" button that allows an invited user to object to one or more digital images. In one implementation, when a user clicks the notify button, an e-mail is sent to the monitoring system 246; however, other means of communicating notifications are clearly contemplated. The notification may allow a user to identify a specific offending image or may allow a user to identify a group of images, such as an album or film roll containing one or more offensive digital images. The user may also be given an opportunity to comment on the image and provide an explanation of why the image is offensive to the user.

Next, an investigation report is generated based upon the notification (step 610). In general, the host system 20 generates the investigation report in an automated fashion. In one implementation, the host system 20 includes a monitoring system 246 configured to compile investigation reports in response to notifications from users. Generating an investigation report may involve compiling information regarding the offending digital image or group of images containing one or more offending images. Some information may be supplied by the complaining user(s) and some information may be automatically generated by the monitoring system 246. Different categories or levels indicating the degree of the image offensiveness/unacceptability may be assigned to the image, and the action taken may be based upon the assigned level. For example, stored images may be scanned periodically for an indication that the image has been assigned a certain level, and appropriate action for the assigned level may be taken.

The investigation report information may include: the photo ID and the album ID of the picture album, the member-created picture album name and the name, if any, of the individual photos, the screen name of the picture album owner/creator, an indicator if the album owner is a member of the OSP or another type of member, the country code of the picture album owner, the date and time the picture album was created/edited, the file size of the reported photo ID for the low resolution image size, the date and time that the report was sent to the image monitoring system 246, the screen name of the member reporting the picture album, client information (e.g., platform, client version) of the member reporting the album, the violation category/level of the offending image, comments from the complaining user, and the list of shared members for the reported picture album.

Immediately, or within a relatively short period of time (e.g., 5 minutes), after the notification is received, a storage location associated with the complaining user is identified (step 615). In general, the host system 20 identifies an appropriate database (e.g., image farm database 2404) containing metadata associated with the complaining user. Identifying the appropriate database may include determining a storage space group containing the appropriate image farm database 2404 from account information associated with the complaining user. For example, the account name (e.g., screen name) associated with the complaining user may be encoded using a proprietary OSP hashing code. In one implementation, the monitoring system 246 applies the same proprietary hashing code to the user's screen name, as described above, and is mapped by the distribution server 2402 to the appropriate storage space group, i.e., bucket, containing the image farm database 2404.

After the storage location is identified (step 615), metadata associated with the complaining user is modified to block the complaining user from reviewing the offending image (step 620). In general, the host system 20 modifies metadata associated with the complaining user and metadata associated with the offending digital image. In one implementation, the monitoring system 246 finds a film reference table 2406a corresponding to the offending digital image in complaining member's bucket. The monitoring system 246 invokes an unsharing procedure that identifies the complaining user's screen name and film identifier corresponding to the offending digital image as parameters and searches film and image tables 2406 and account tables 2408 in the complaining user's bucket. The monitoring system 246 removes metadata corresponding to the offending digital image from tables (e.g., account information table 2406a) associated with the complaining user and removes metadata corresponding to the complaining user from tables (e.g., film reference table 2406a) associated with the offending digital image. Alternatively, rather than merely removing metadata, the monitoring system 246 may add metadata to positively block the content. Also, metadata may be locked to prevent the owner from making changes to the content.

In yet another implementation, the offending image may be replaced with a nonoffensive image, such as a grayed out or blank image. The offending image may be stored in a different location pending review of the image. Typically, the offending image would be stored in a location that is not accessible by users of the computer system, such as an offline storage location while it is being reviewed. If the image is found to be nonoffensive after completion of the review, the image may be restored to its original location. In this fashion, database integrity may be maintained, yet any existing link on the computer system pointing to the potentially offensive image will lead to the display of a substitute non-offensive image. Therefore, it is not necessary to seek out and change links pointing to the offensive image because it will not result in a user viewing potentially offensive content. In another implementation, action would be taken only after a final review of the image is complete.

A storage location associated with the owner of the offending digital image also is identified (step 625). In general, the host system 20 identifies an appropriate database (e.g., image farm database 2404) containing metadata associated with the owner of the offending digital image. Identifying the appropriate database may include determining an account name (e.g., screen name) associated with the owner of the offending digital image. The owner's screen name may be obtained from the film reference table 2406a in the complaining user's bucket, for example. Identifying the appropriate database also may include determining a storage space group containing the appropriate image farm database 2404 from account information associated with the complaining user. For example, the account name (e.g., screen name) associated with the offending digital image may be encoded using a proprietary OSP hashing code. In one implementation, the monitoring system 246 applies the same proprietary hashing code to the owner's screen name as described above and is mapped by the distribution server 2402 to the appropriate storage space group, i.e., bucket, containing the image farm database 2404.

After the storage location associated with the owner of the offending digital image is identified (step 625), metadata associated with the owner is modified to block the owner from sharing the digital image with the user (step 630). In general, the host system 20 modifies metadata associated with the owner and metadata associated with the offending digital image. In one implementation, the monitoring system 246 finds a film reference table 2406a corresponding to the offending digital image in the owner's bucket. The monitoring system 246 invokes an unsharing procedure that takes the owner's screen name and film identifier corresponding to the offending digital image as parameters and searches film and image tables 2406 and account tables 2408 in the owner's bucket. The monitoring system 246 then removes metadata corresponding to the complaining user from tables (e.g., film reference table 2406a) associated with the offending digital image and may insert metadata (e.g., purge flag) into tables (e.g., film reference table 2406a, account information table 2408a) indicating that the offending digital image is under investigation. At this stage of the procedure 600, the complaining user can no longer access the offending digital image. However, reporting a digital image or album may have no effect on the ability of other users on the roster of a shared album to view the digital image or album until after an administrative review is completed. However, metadata may optionally be locked to prevent the owner from making changes to the content.

In yet another implementation, the offending image may be replaced with a nonoffensive image, such as a grayed out or blank image, as described above.

Next, a separate storage location containing the digital image is identified (step 635). In general, the host system 20 identifies the storage location of digital images. In general, the film and image tables 2406 are searchable by various criteria (e.g., primary keys) including screen name. For example, by passing a complaining user's and/or owner's screen name to the film and image tables 2406, the monitoring system 246 can retrieve image records and/or film records associated with the offending digital image. Typically, the retrieved records will include image identifiers referencing one or more stored digital images. The monitoring system 246 can use the image identifiers (e.g., image_id_p1 and image_id_p2) to determine the storage path of a particular digital image stored in a particular image storage server 2412 within the image storage server system 2410.

Then, the offending digital image is accessed or otherwise retrieved (step 640). In general, the host system 20 retrieves the offending digital images. In one implementation, the host system 20 includes a monitoring system 246 configured to navigate to the appropriate storage path in the image storage server system 2410.

Next, the offending digital image is reviewed for compliance with the terms of the image service (step 645). In general, the host system 20 displays the offending digital image for review. In one implementation, the monitoring system 246 displays a particular offending digital image to an OSP administrator for review. Typically, the terms of service (e.g., policies) are established by administrators of the OSP host complex 230 and are used to regulate the type of content that is acceptable for sharing among users. In one implementation, the OSP administrator conducting the review may be a governmental or a third party regulator.

Reviewing a digital image may involve analyzing an investigation report associated with the offending digital image. In general, an investigation report associated with an offending digital image is stored in a database queue to await action by an OSP administrator. Typically, several OSP administrators will be available to conduct reviews. Investigation reports are routed to an appropriate OSP administrator based on the country code of the owner of the digital image.

Reviewing a digital image may involve classifying an investigation report. The classification may indicate a level corresponding to the degree of offensiveness/unacceptability of the digital image. In general, the investigation reports may be categorized according to the reported type of violation and review status. For example, all new reports may be classified as a "general" violation. As reports are reviewed, depending on the content of the page, the report may be designated as "acceptable" or "unacceptable." In addition, a report may designate the complaint as relating to a non-garden variety "NOV" violation requiring further review. Further, the OSP administrator reviewing NOV reports may mark reports as pending legal review "PLR" in extreme cases. In general, the OSP administrators may include different specialists (e.g., legal personnel) for reviewing different categories of violations.

Finally, appropriate action is taken based on conclusions drawn from review of the digital image (step 650). In general, the host system 20 takes appropriate action based on the review of the digital image by the OSP administrator. In one implementation, the host system 20 includes a monitoring system 246 configured to take different levels of action depending upon the nature of the offending content. Such actions may range, for example, from blocking the complaining user from reviewing the offending digital image to deleting the digital image, canceling the offender's account, and alerting law enforcement authorities. In one implementation, the offending image may be replaced with a non-offensive image, such as a grayed out or blank image, as described above.

If after reviewing the digital image, the OSP administrator determines that there is no violation, the OSP administrator will indicate that the digital image is "acceptable." While the complaining user will have no further access to the particular image, other users sharing the digital image will be unaffected by the complaint. In another implementation, if the image had been replaced with a grayed out or other non-offensive image, the original image may be restored once the review is complete and the image deemed acceptable.

If the digital image is deemed to be in violation of the terms of service or other regulatory requirement, the OSP administrator indicates that the digital image is "unacceptable." In this case, the monitoring system 246 may take action with respect to the image itself or the owner. For instance, a warning e-mail may be sent to the owner of the unacceptable digital image, and the violation may be reported or documented in the owner's account history. Alternatively, the monitoring system 246 may simply unshare the digital image. This function will allow the owner to still have access to their digital images, but no longer allow the owner to share images or albums with a particular user or users, particular categories of users, or all other users. Depending on the severity of the violation, the monitoring system 246 also may delete the digital image and metadata describing the digital image from all tables and/or terminate the owner's account. In another implementation, the offending image may be replaced with a non-offensive image, such as a grayed out or blank image, as described above.

In cases where the content of the digital image warrants further review, the OSP administrator may forward the digital image and its associated report to a NOV specialist. The NOV specialist may make a final determination as to whether the digital image is acceptable or unacceptable.

In extreme cases, where the content of the digital image may be illegal, the OSP administrator may forward the digital image and its associated report to legal or regulatory personnel, within the OSP organization or otherwise. The monitoring system 246 may block the violator's entire picture album from being viewed by anyone except OSP administrators and legal personnel. The legal review specialist may make a final determination as to whether the digital image is acceptable or unacceptable. In some cases, the legal specialist may inform or be affiliated with law enforcement.

A peremptory, automated investigation or review of an image may be possible. Also, the action taken in response to a notification of an offending image may be fully automated or partially automated. For example, a human reviewer may manually investigate the image and assign an indication of whether the image is acceptable or unacceptable, and may also assign a level corresponding to the unacceptability of the image. In another implementation, the review may be conducted in a fully automated manner, using techniques well known in the art. In yet another implementation, an investigation of an image may be undertaken only after reviewing a threshold number of complaints from one or more users.

A number of implementations have been described. Nevertheless, it will be understood that various modifications may be made and that other implementations are within the scope of the following claims. For example, if a more elaborate method of preventing unauthorized users from making simple, incremental changes to a known image path ("walking the href") to find other image paths is needed, an encryption algorithm can be applied to the first and second image identifiers.

The invention claimed is:

1. A method for monitoring digital images, the method comprising:
    receiving, using a hardware processor, a content item from a first user device;
    receiving, using the hardware processor, a notification from a second user device that the content item contains inappropriate content;
    in response to receiving the notification, initiating an investigation that automatically determines a category of the inappropriate content contained in the content item;
    updating metadata associated with the content item by inserting a status indicator of the investigation;
    inhibiting the content item from being presented on other user devices including the first user device and the second user device based on the category of the inappropriate content and based on the status indicator inserted in the metadata of the content item in response to receiving a request from one of the user devices for the content item; and
    transmitting a message to the first user device indicating that the content item has been blocked.

2. The method of claim 1, further comprising receiving, via a user interface presented on the second user device, text content entered by a user of the second user device relating to the notification that the content item contains inappropriate content.

3. The method of claim 1, wherein the other user devices are associated with users in a particular category of users.

4. The method of claim 1, further comprising replacing the content item with a replacement content item corresponding to the content item to be displayed on the other user devices.

5. The method of claim 1, further comprising storing an indication that presentation of the content item has been blocked in association with an identifier of an account associated with the first user device.

6. The method of claim 1, further comprising:
    generating a report based on the received notification, wherein the report includes an identifier of the content item, an identifier of the first user device, and the category of inappropriate content contained in the content item; and
    transmitting the report to a third user device for review.

7. The method of claim 1, wherein copyright information associated with the content item is stored in association with an identifier of the content item.

8. A system for monitoring digital images, the system comprising:
    a memory; and
    a hardware processor that, when executing computer executable instructions stored in the memory, is programmed to:
        receive a content item from a first user device;
        receive a notification from a second user device that the content item contains inappropriate content;
        in response to receiving the notification, initiate an investigation that automatically determines a category of the inappropriate content contained in the content item;
        update metadata associated with the content item by inserting a status indicator of the investigation;
        inhibit the content item from being presented on other user devices including the first user device and the second user device based on the category of the inappropriate content and based on the status indicator inserted in the metadata of the content item in response to receiving a request from one of the user devices for the content item; and
        transmit a message to the first user device indicating that the content item has been blocked.

9. The system of claim 8, wherein the hardware processor is further configured to receive, via a user interface presented on the second user device, text content entered by a user of the second user device relating to the notification that the content item contains inappropriate content.

10. The system of claim 8, wherein the other user devices are associated with users in a particular category of users.

11. The system of claim 8, wherein the hardware processor is further configured to replace the content item with a replacement content item corresponding to the content item to be displayed on the other user devices.

12. The system of claim 8, wherein the hardware processor is further configured to store an indication that presentation of the content item has been blocked in association with an identifier of an account associated with the first user device.

13. The system of claim 8, wherein the hardware processor is further configured to:
   generate a report based on the received notification, wherein the report includes an identifier of the content item, an identifier of the first user device, and the category of inappropriate content contained in the content item; and
   transmit the report to a third user device for review.

14. The system of claim 8, wherein copyright information associated with the content item is stored in association with an identifier of the content item.

15. A non-transitory computer-readable medium containing computer executable instructions that, when executed by a processor, cause the processor to perform a method for monitoring digital images, the method comprising:
   receiving, using a hardware processor, a content item from a first user device;
   receiving, using the hardware processor, a notification from a second user device that the content item contains inappropriate content;
   in response to receiving the notification, initiating an investigation that automatically determines a category of the inappropriate content contained in the content item;
   updating metadata associated with the content item by inserting a status indicator of the investigation;
   inhibiting the content item from being presented on other user devices including the first user device and the second user device based on the category of the inappropriate content and based on the status indicator inserted in the metadata of the content item in response to receiving a request from one of the user devices for the content item; and
   transmitting a message to the first user device indicating that the content item has been blocked.

16. The non-transitory computer-readable medium of claim 15, wherein the method further comprises receiving, via a user interface presented on the second user device, text content entered by a user of the second user device relating to the notification that the content item contains inappropriate content.

17. The non-transitory computer-readable medium of claim 15, wherein the other user devices are associated with users in a particular category of users.

18. The non-transitory computer-readable medium of claim 15, wherein the method further comprises replacing the content item with a replacement content item corresponding to the content item to be displayed on the other user devices.

19. The non-transitory computer-readable medium of claim 15, wherein the method further comprises storing an indication that presentation of the content item has been blocked in association with an identifier of an account associated with the first user device.

20. The non-transitory computer-readable medium of claim 15, wherein the method further comprises:
   generating a report based on the received notification, wherein the report includes an identifier of the content item, an identifier of the first user device, and the category of inappropriate content contained in the content item; and
   transmitting the report to a third user device for review.

21. The non-transitory computer-readable medium of claim 15, wherein copyright information associated with the content item is stored in association with an identifier of the content item.

* * * * *